US005789509A

United States Patent [19]
Schmiegel

[11] Patent Number: 5,789,509
[45] Date of Patent: Aug. 4, 1998

[54] PERFLOUROELASTOMER COMPOSITION HAVING IMPROVED PROCESSABILITY

[75] Inventor: Walter Werner Schmiegel, Wilmington, Del.

[73] Assignee: E. I. du Pont de Nemours and Company, Wilmington, Del.

[21] Appl. No.: 909,898

[22] Filed: Aug. 12, 1997

Related U.S. Application Data

[63] Continuation of Ser. No. 755,946, Nov. 25, 1996, abandoned.

[51] Int. Cl.[6] ........................................ C08F 16/24
[52] U.S. Cl. ............................... 526/247; 526/229
[58] Field of Search .................................. 526/247

[56] References Cited

U.S. PATENT DOCUMENTS

| | | | |
|---|---|---|---|
| 3,085,083 | 4/1963 | Schreyer | 260/87.5 |
| 3,956,000 | 5/1976 | Kuhls et al. | 106/270 |
| 4,281,092 | 7/1981 | Breazeale | 526/247 |
| 4,394,489 | 7/1983 | Aufdermarsh | 525/370 |
| 4,525,539 | 6/1985 | Feiring | 525/326.3 |
| 4,713,418 | 12/1987 | Logothetis et al. | 525/200 |
| 4,879,362 | 11/1989 | Morgan | 526/247 |
| 5,051,479 | 9/1991 | Logothetis et al. | 525/197 |
| 5,185,414 | 2/1993 | Mellish | 526/247 |
| 5,447,993 | 9/1995 | Logothetis | 525/272 |
| 5,461,129 | 10/1995 | Kurihara et al. | 526/247 |

FOREIGN PATENT DOCUMENTS

| | | | |
|---|---|---|---|
| 0129143 | 12/1984 | European Pat. Off. | 526/247 |
| 0220910 | 5/1987 | European Pat. Off. . | |
| 0457255 | 11/1991 | European Pat. Off. . | |
| 0 606 883 A1 | 7/1994 | European Pat. Off. . | |
| 0648787 | 4/1995 | European Pat. Off. . | |
| 63-210157 | 8/1988 | Japan | 526/247 |
| 63-218715 | 9/1988 | Japan | 526/247 |
| 398085 | 2/1966 | Switzerland . | |
| 0953152 | 3/1964 | United Kingdom | 526/247 |
| 95/22575 | 8/1995 | WIPO . | |

OTHER PUBLICATIONS

Logothetis, *Chemistry of Fluorocarbon Elastomers*, Prog. Polym. Sci. vol. 14, 1989 Pergamon Press plc, pp. 251–296.
U.S. application No. 08/755,919, Coughlin et al., filed Nov. 25, 1996.
U.S. application No. 08/756,310, Logothetis et al., filed Nov. 25, 1996.

*Primary Examiner*—Joseph L. Schofer
*Assistant Examiner*—N. Sarofim

[57] ABSTRACT

Perfluoroelastomer compositions of improved processability are provided which have reduced levels of ionized or ionizable polymer endgroups.

6 Claims, No Drawings

PERFLOUROELASTOMER COMPOSITION HAVING IMPROVED PROCESSABILITY

CROSS-REFERENCE TO RELATED APPLICATIONS

This application is a continuation of U.S. application No. 08/755,946 filed Nov. 25, 1996 now abandoned.

FIELD OF THE INVENTION

This invention relates to perfluoroelastomer compositions which have excellent processability, and which, when cured, have outstanding thermal stability and chemical resistance.

BACKGROUND OF THE INVENTION

Perfluoroelastomers (elastomeric perfluoropolymers) are polymeric materials which exhibit outstanding high temperature tolerance and chemical resistance. Consequently, such compositions are particularly adapted for use as seals and gaskets in systems in which elevated temperatures and/or corrosive chemicals are encountered. The outstanding properties of perfluoropolymers are largely attributable to the stability and inertness of the copolymerized perfluorinated monomer units which make up the major portion of the polymer backbone, e.g., tetrafluoroethylene and perfluoro(alkyl vinyl) ethers. In order to completely develop elastomeric properties, perfluoropolymers are typically crosslinked, i.e. vulcanized. To this end, a small percentage of cure site monomer is copolymerized with the perfluorinated monomer units. Cure site monomers containing at least one nitrile group, for example perfluoro-8-cyano-5-methyl-3,6-dioxa-1-octene, are especially preferred. Such compositions are described in U.S. Pat. Nos. 4,281,092 and 4,394,489; and in International Application WO 95/22575.

A recently-developed class of perfluoroelastomers having carbonyl-containing functional groups is disclosed in co-pending U.S. patent application Ser. No. 08/755,919 filed Nov. 25, 1996. These polymers are characterized by having carbonyl-containing functional groups, including carboxyl groups, carboxylate groups, carboxamide groups, and mixtures thereof. Preferably, the carbonyl-containing functional groups are generated as a result of persulfate initiation of the polymerization reaction and the reaction is carried out in the absence of sulfite of bisulfite reducing agents. The carbonyl-containing perfluoroelastomers exhibit outstanding cure characteristics but they are difficult to process in certain end-uses because of their relatively high viscosity. A method for decreasing viscosity of the carbonyl-containing perfluoroelastomers would permit use of these materials in a wider variety of end-use applications.

SUMMARY OF THE INVENTION

The present invention provides a composition comprising a perfluoroelastomer comprising copolymerized units of (1) a perfluoroolefin and (2) a perfluorovinyl ether selected from the group consisting of perfluoro(alkyl vinyl) ethers, perfluoro(alkoxy vinyl) ethers, and mixtures thereof, wherein the perfluoroelastomer is characterized by being substantially free of functional groups selected from the group consisting of i) ionized or ionizable endgroups, ii) bromine-containing groups, and iii) iodine-containing groups.

The invention is further directed to a curable perfluoroelastomer composition comprising A) a perfluoroelastomer comprising copolymerized units of (1) a perfluoroolefin and (2) a perfluorovinyl ether selected from the group consisting of perfluoro(alkyl vinyl) ethers, perfluoro(alkoxy vinyl) ethers, and mixtures thereof, wherein the perfluoroelastomer is characterized by being substantially free of functional groups selected from the group consisting of i) ionized or ionizable endgroups, ii) bromine-containing groups, and iii) iodine-containing groups; and B) a curing agent.

The invention is also directed to a process for preparation of an uncured perfluoroelastomer composition comprising the steps of A) preparing a perfluoroelastomer having a plurality of carbonyl-containing functional groups selected from the group consisting of carboxyl endgroups, carboxylate endgroups, carboxamide endgroups, and mixtures thereof by copolymerizing a monomer mixture comprising a) a perfluoroolefin monomer and b) a perfluorovinyl ether monomer selected from the group consisting of perfluoro(alkyl vinyl) ethers, perfluoro (alkoxy vinyl) ethers, and mixtures thereof at a pressure of from 4–10 MPa, in the presence of a persulfate free radical initiator, in a polymerization mixture, wherein i) the feed ratio of monomer to initiator is controlled so that the ratio of the radical flux to the polymerization rate, $R_f/R_p$, is from about 10 to 50 millimoles per kilogram, and ii) less than 5 mole percent of a sulfite or bisulfite reducing agent, based on the millimoles of persulfate initiator, is present in the polymerization mixture;

B) isolating said perfluoroelastomer having a plurality of carbonyl-containing functional groups from the polymerization mixture; and C) heating said isolated perfluoroelastomer having a plurality of carbonyl-containing functional groups at a temperature of at least 250° C. for a time sufficient to at least partially decarboxylate the perfluoroelastomer.

In addition, the present invention is directed to an uncured perfluoroelastomer composition prepared by a process comprising the steps of A) preparing a perfluoroelastomer having a plurality of carbonyl-containing functional groups selected from the group consisting of carboxyl endgroups, carboxylate endgroups, carboxamide endgroups, and mixtures thereof by copolymerizing a monomer mixture comprising a) a perfluoroolefin monomer and b) a perfluorovinyl ether monomer selected from the group consisting of perfluoro(alkyl vinyl) ethers, perfluoro (alkoxy vinyl) ethers, and mixtures thereof at a pressure of from 4–10 MPa, in the presence of a persulfate free radical initiator in a polymerization mixture, wherein i) the feed ratio of monomer to initiator is controlled so that the ratio of the radical flux to the polymerization rate, $R_f/R_p$, is from about 10 to 50 millimoles per kilogram, and ii) less than 5 mole percent of a sulfite or bisulfite reducing agent, based on the millimoles of persulfate initiator, is present in the polymerization mixture;

B) isolating said perfluoroelastomer having a plurality of carbonyl-containing functional groups from the polymerization mixture; and C) heating said isolated perfluoroelastomer having a plurality of carbonyl-containing functional groups at a temperature of at least 250° C. for a time sufficient to at least partially decarboxylate the perfluoroelastomer.

The invention is further directed to a curable compositions comprising the product produced by the above-described process and a curing agent.

The invention is also directed to curable compositions comprising
  (A) a perfluoroelastomer comprising copolymerized units of (1) a perfluoroolefin; (2) a perfluorovinyl ether selected from the group consisting of perfluoro(alkyl vinyl) ethers, perfluoro(alkoxy vinyl) ethers, and mixtures thereof; and (3) a cure site monomer having at least one nitrile group, selected from the group consisting of fluorinated olefins having at least one nitrile group, fluorinated vinyl ethers having at least one nitrile group, and mixtures thereof; wherein the perfluoroelastomer is characterized by i) having a plurality of carbonyl-containing endgroups selected from the group consisting of carboxyl endgroups, carboxylate endgroups, carboxamide endgroups, and mixtures thereof and ii) being substantially free of ionizable or ionized endgroups other than those having carbonyl-containing functional groups; and wherein the integrated absorbance ratio of the carbonyl-containing endgroups is greater than 0.1, the integrated absorbance ratio being determined by calculating the ratio of the integrated peak intensity within the range of 1620–1840 cm$^{-1}$ to that within the range of 2220–2740 cm$^{-1}$, as measured on a Fourier transform infrared spectrum of the perfluoroelastomer; and
  (B) about 0.1–10 parts by weight per hundred parts by weight perfluoroelastomer of a curing agent other than an organotin curing agent.

The invention is further directed to a curable perfluoroelastomer composition comprising
  (A) a perfluoroelastomer having a plurality of carbonyl-containing functional groups selected from the group consisting of carboxyl groups, carboxylate groups, and carboxamide groups, said perfluoroelastomer comprising copolymerized units of (1) a perfluoroolefin; (2) a perfluorovinyl ether selected from the group consisting of perfluoro(alkyl vinyl) ethers, perfluoro(alkoxy vinyl) ethers, and mixtures thereof; (3) a fluorinated comonomer selected from the group consisting of carboxyl-containing and carboxylate-containing comonomers, and (4) a cure site monomer having at least one nitrile group, selected from the group consisting of fluorinated olefins having nitrile groups, fluorinated vinyl ethers having at least one nitrile group and mixtures thereof wherein the integrated absorbance ratio of the carbonyl-containing functional groups is greater than 0.1, the absorbance ratio being determined by calculating the ratio of the integrated peak intensity within the range of 1620–1840 cm$^{-1}$ to that within the range of 2220–2740 cm$^{-1}$, as measured on a Fourier transform infrared spectrum of the perfluoroelastomer; and
  (B) about 0.1 to about 10 parts by weight per hundred parts by weight perfluoroelastomer of a curing agent other than an organotin curing agent.

DETAILED DESCRIPTION OF THE INVENTION

The compositions of the present invention comprise perfluoroelastomers of several types which can be classified according to the nature of polymer endgroups present. In particular, the perfluoroelastomer compositions are characterized by having endgroups which are non-ionized or non-ionizable. Perfluoroelastomers having non-ionized or non-ionizable brominated or iodinated endgroups are known. The perfluoroelastomers of the present invention are, however, substantially free of brominated or iodinated endgroups.

The first type of perfluoroelastomer of the present invention comprises perfluoroelastomers which are substantially free of endgroups selected from the group consisting of a) ionized or ionizable endgroups, b) bromine-containing endgroups, and c) iodine-containing endgroups. With regard to this first type of perfluoroelastomer composition, substantially free of ionized of ionizable endgroups means that less than 5% of the polymer endgroups present are ionized or ionizable. Examples of ionized or ionizable endgroups include carboxylic acid endgroups, carboxylate endgroups, sulfonic acid endgroups, and sulfonate endgroups. By substantially free of bromine-containing endgroups and iodine-containing endgroups is meant that less than 0.01 weight percent iodine or bromine is present in the polymer endgroups.

A second type of perfluoroelastomer of the present invention comprises a class of perfluoroelastomers wherein some ionized or ionizable carbonyl-containing endgroups are present. By ionized or ionizable carbonyl-containing endgroups is meant carboxylate endgroups or carboxylic acid endgroups, respectively. Preferably, no more than 80% of the endgroups will be represented by ionized or ionizable carbonyl-containing endgroups because higher levels of such endgroups are detrimental to polymer processability. However, under high shear, even a 10% reduction of carbonyl-containing endgroups will result in improved polymer rheology. These compositions are further characterized in that substantially no type of ionized or ionizable endgroup other than carbonyl-containing ionized or ionizable endgroups is present. By substantially no other type of ionized or ionizable endgroup it is meant that no more than 0.75 millimoles per kilogram of polymer of these other ionizable or ionized endgroups are present. Such other ionized or ionizable endgroups include sulfonic acid and sulfonate endgroups. If these non-carboxyl or non-carboxylate groups are present in significant quantity, then the viscosity of the polymer begins to increase, which makes polymer processing difficult. This second class of perfluoroelastomer compositions of the present invention are prepared by partial decarboxylation of perfluoroelastomers having ionized or ionizable carbonyl-containing functional groups.

The present invention also includes curable compositions comprising the above-described two types of perfluoroelastomers in combination with curatives.

A further class of compositions of the present invention comprises curable perfluoroelastomer compositions comprising a perfluoroelastomer component having substantial levels of carbonyl-containing functional groups in combination with a curative component wherein the curative is other than an organotin compound. Such perfluoroelastomers cured with organotin compounds are disclosed in co-pending U.S. patent application Ser. No. 08/755,919 filed Nov. 25, 1996.

The present invention is also directed to a process for preparation of perfluoroelastomers having improved processability. The process involves reduction of the level of ionized or ionizable carbonyl-containing groups in the polymer by decarboxylation of perfluoroelastomers having carboxyl or carboxylate endgroups or carboxyl or carboxylate pendant functional groups.

Perfluoroelastomers are polymeric compositions having copolymerized units of at least two principal perfluorinated monomers. Generally, one of the principal comonomers is a perfluoroolefin while the other is a perfluorovinyl ether. Representative perfluorinated olefins include tetrafluoroethylene, and hexafluoropropylene. Suitable perfluorinated vinyl ethers are those of the formula

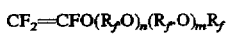    (I)

where $R_f$ and $R_{f'}$ are different linear or branched perfluoroalkylene groups of 2–6 carbon atoms, m and n are independently 0–10, and $R_{f''}$ is a perfluoroalkyl group of 1–6 carbon atoms.

A preferred class of perfluoro(alkyl vinyl) ethers includes compositions of the formula

    (II)

where X is F or $CF_3$, n is 0–5, and $R_f$ is a perfluoroalkyl group of 1–6 carbon atoms.

Most preferred perfluoro(alkyl vinyl) ethers are those wherein n is 0 or 1 and $R_f$ contains 1–3 carbon atoms. Examples of such perfluorinated ethers include perfluoro (methyl vinyl) ether and perfluoro(propyl vinyl) ether. Other useful monomers include compounds of the formula

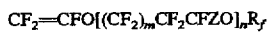    (III)

where $R_f$ is a perfluoroalkyl group having 1–6 carbon atoms, m=0 or 1,n=0–5,and Z=F or $CF_3$.

Preferred members of this class are those in which $R_f$ is $C_3F_7$, m=0, and n=1. Additional perfluoro(alkyl vinyl) ether monomers include compounds of the formula

    (IV)

where m and n=1–10, p=0–3, and x=1–5.

Preferred members of this class include compounds where n=0–1, m=0–1, and x=1.

Examples of useful perfluoro(alkoxy vinyl) ethers include

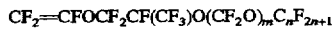    (V)

where n=1–5, m=1–3, and where, preferably, n=1.

Mixtures of perfluoro(alkyl vinyl) ethers and perfluoro (alkoxy vinyl) ethers may also be used.

Preferred copolymers are composed of tetrafluoroethylene and at least one perfluoro(alkyl vinyl) ether as principal monomer units. In such copolymers, the copolymerized perfluorinated ether units constitute from about 15–50 mole percent of total monomer units in the polymer.

Typically, the perfluoropolymer further contains copolymerized units of at least one cure site monomer, generally in amounts of from 0.1–5 mole percent. The range is preferably between 0.3–1.5 mole percent. Although more than one type of cure site monomer may be present, most commonly one cure site monomer is used and it contains at least one nitrile substituent group. Suitable cure site monomers include nitrile-containing fluorinated olefins and nitrile-containing fluorinated vinyl ethers. Useful cyano-substituted cure site monomers include those of the formulas shown below.

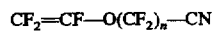    (VI)

where n=2–12, preferably 2–6;

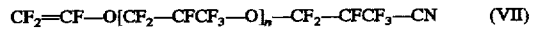    (VII)

where n=0–4, preferably 0–2; and

    (VIII)

where x=1–2, and n=1–4.

Those of formula (VIII) are preferred. Especially preferred cure site monomers are perfluorinated polyethers having a nitrile group and a trifluorovinyl ether group. A most preferred cure site monomer is

    (IX)

i.e. perfluoro(8-cyano-5-methyl-3,6-dioxa-1-octene) or 8-CNVE.

Other cure site monomers include olefins represented by the formula $R_1CH=CR_2R_3$, wherein $R_1$ and $R_2$ are independently selected from hydrogen and fluorine and $R_3$ is independently selected from hydrogen, fluorine, alkyl, and perfluoroalkyl. The perfluoroalkyl group may contain up to about 12 carbon atoms. However, perfluoroalkyl groups of up to 4 carbon atoms are preferred. In addition, the curesite monomer preferably has no more than three hydrogen atoms. Examples of such olefins include ethylene, vinylidene fluoride, vinyl fluoride, trifluoroethylene, 1-hydropentafluoropropene, and 2-hydropentafluoropropene.

An especially preferred perfluoroelastomer contains 53.0–79.9 mole percent tetrafluoroethylene, 20.0–46.9 mole percent perfluoro(methyl vinyl) ether and 0.4 to 1.5 mole percent nitrile-containing cure site monomer.

Any carbonyl-containing functional groups present in the perfluoroelastomers of this invention are either present as polymer endgroups or as pendant functionalities introduced as a result of copolymerization of fluorinated carbonyl-containing comonomers. By carbonyl-containing comonomer is meant a fluorinated monomer having a copolymerizable double bond and at least one pendant carboxylic acid group (including salts thereof), pendant carboxylic acid ester group, or pendant carboxamide group. Such comonomers are represented by compounds represented by formulas (X) and (XI):

    (X)

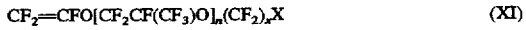    (XI)

where n=1–4, x=2–5, and

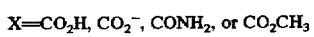

Depending on the carbonyl-containing comonomer selected, the resulting polymer would have carboxyl, carboxylate, or carboxamide (i.e. carboxylic acid amide) groups at any point on the chain, i.e. at the chain end, within the chain, or both.

Perfluoroelastomers having carboxyl or carboxylate endgroups can be prepared by polymerization of mixtures of perfluoroolefins and perfluorovinyl ethers in the presence of a free radical generating initiator either in bulk, in solution in an inert solvent, in aqueous suspension, or in aqueous emulsion. Perfluoroelastomer polymerization techniques are described in general in Logothetis, Prog. Polymn. Sci, Vol. 14, 252–296 (1989) and in co-pending U.S. patent application Ser. No. 08/755,919 filed Nov. 25, 1996. The Logothetis article discloses, among others, a method of polymerization which involves initiation by persulfates, such as ammonium or potassium persulfate, in the absence of a reducing agent. Thermally initiated free-radical polymerization using persulfates in the absence of a reducing agent results in the production of polymers having carboxylic acid end groups which ionize to form carboxylate groups. Reducing agents include such compounds as sodium sulfite and sodium hydrogen sulfite.

As described in co-pending U.S. patent application Ser. No. 08/755,919 filed Nov. 25, 1996, carboxylated polymers having superior cure characteristics may be obtained by copolymerizing perfluoroolefins and perfluorovinyl ethers by initiating the copolymerization reaction with ammonium persulfate, in the absence of a reducing agent, in aqueous emulsion in a continuous well-stirred reactor with a residence time of 2–4 hours, at a temperature of 75° C.–90° C. and at a pressure of 2–8 MPa. Preferably the residence time is between 3.0–3.7 hours, the temperature is 80° C.–85° C., and the pressure is 6.0–8.0 MPa. If levels of reducing agent above 5 mole percent, based on ammonium persulfate, are present, then the amount of sulfonate endgroups reaches a level which has detrimental effects on processability. In addition, in order to obtain the fast cure rates typical of the compositions disclosed, the pH of the polymerization reaction mixture is generally between 3.5–7.0, preferably between 4.5–6.5. Tetrafluoroethylene and perfluoro(methyl vinyl) ether monomers are preferred and are fed by compressor. If a cure site monomer is used, it is preferably fed by liquid metering pump or by a compressor. This polymerization method results in production of a perfluoroelastomer copolymer composition having a significant proportion of carboxyl-containing end groups, carboxylate-containing endgroups, carboxamide endgroups, or mixtures thereof. The number of carboxyl, carboxylate, and carboxamide groups present in the nitrile-containing perfluoroelastomers accounts for the carbonyl content and is related to the ratio of radicals generated to polymerization rate. Specifically, the ratio of the radical generation rate, calculated from persulfate thermal decomposition kinetics, to the polymerization rate provides a measure of the carbonyl content of the polymer. Thermal decomposition rates for persulfate are correlated in F. A. Bovey, et al., "Emulsion Polymerization", Interscience Publishers, New York, 1955. At 85° C., the first order decomposition rate coefficient is 0.011/minute. For a continuous stirred tank reactor at 85° C. and a residence time of 218 minutes, about 70% of persulfate fed would decompose to produce a radical flux $R_i$ (mmol/hour) of sulfate radicals equal to 1.4 times the persulfate fed (mmol/hour). Actual initiator efficiency could be significantly less than that assumed in this calculation, depending on polymer conditions and type of monomer involved. The polymerization rate $R_p$ (kg/hour) is readily measured, so that the ratio $R_i/R_p$ can be calculated for correlation with the observed carboxylate levels. Generally, for purposes of the present invention, the ratio $R_i/R_p$ should be in the range of about 10–50 mmol/kg, preferably 20–40 mmol/kg.

Carbonyl-containing functional groups may also be introduced by copolymerization of fluorinated carboxyl-containing comonomers with the principal perfluoroolefins and perfluorovinyl ether comonomers. Cure site monomers may also be copolymerized into the polymer as well. Such copolymerizations may be conducted substantially as described above. If the sole initiator is a persulfate salt, then carbonyl-containing endgroups will also result. If a sulfite or bisulfite reducing agent is additionally present, then the resultant copolymers will contain sulfonic acid or sulfonate endgroups and carboxyl or carboxylate groups.

The polymer emulsion, upon exiting the reactor, is coagulated with an aqueous solution of a multivalent metal salt, such as magnesium sulfate. The coagulated polymer is then washed with deionized water and dried at 70°–100° C. in a circulating air oven.

In order to produce the perfluoroelastomers of the present invention which are substantially free of ionized or ionizable carbonyl-containing endgroups, decarboxylation of carboxylated perfluoroelastomers, such as those described above, is conveniently carried out by heat-treating the solid carboxylated perfluoroelastomers, which have been isolated and oven-dried. It is not necessary that the polymer be completely dry. That is, the polymer may be completely or partially dried prior to the decarboxylation process. In order to effect decarboxylation, the perfluoropolymer is heated to a temperature sufficiently high, and for a sufficiently long period of time, to decarboxylate all of the endgroups and convert them to non-ionizable substituents, for example, difluoromethyl groups, trifluorovinyl groups, or carboxamide groups. This results in a lowering of polymer viscosity. Partially decarboxylated perfluoroelastomers are also useful compositions and may be prepared by heat treating the carboxylated perfluoroelastomer for shorter periods of time. Generally, a temperature of 250° C.–325° C. for a period of several minutes is sufficient to partially decarboxylate the polymer. Thus, a circulating air oven treatment of polymer crumb or sheet at temperatures of about 250°–325° C. is effective in removing a fraction or substantially all of the carbonyl-containing functional groups. Preferably, the polymer will be heated for 30 minutes at a temperature of 280°–320° C. If the temperature is below 250°, then decarboxylation is extremely slow. If the temperature is above 325° C., then the amount of cure site monomer in the polymer may be reduced by the heat treatment. At the lowest temperatures the required heating time is much longer than at the highest temperatures and typical heating times range from about 5 minutes to about 24 hours. The decarboxylation can also be performed in a heated extruder, in a compression mold, or any other conventional heated elastomer processing equipment. The appropriate time will depend on temperature and the degree of decarboxylation desired. It is readily understood by those skilled in the art that other means of increasing the internal temperature of the polymer may be used, for example exposure to microwave radiation.

Unexpectedly, the perfluoroelastomers are not degraded by the heat treating process and retain their excellent response to vulcanization with a variety of curing agents. For example, it has been found that if copolymerized units of nitrile-containing cure site monomers, e.g. 8-CNVE, are present in the perfluoroelastomer, their concentration is essentially unaffected by a properly chosen heating cycle.

The decarboxylation process results in production of a perfluoroelastomer having significantly lowered bulk viscosity compared to the non-decarboxylated polymer, thus improving processability. Another advantage of the lower bulk viscosity of the decarboxylated polymer is that decarboxylated polymers of higher molecular weight than would have been processable in the non-decarboxylated form can now be used. These higher molecular weight polymers impart improved physical properties (e.g. tensile strength, compression set and reduced weight loss at high temperatures) in finished articles. The viscosity decrease is related to the reduction of ionic difunctionality that results from the heat treatment. For example, Mooney viscosity, ML-10 @ 121° C. decreases of 25–40% are typical upon complete decarboxylation.

Low bulk viscosity perfluoroelastomer compositions may also be prepared by blending appropriate amounts of the decarboxylated or partially decarboxylated perfluoroelastomer compositions of the invention with a second perfluoroelastomer. The second perfluoroelastomer may be a perfluoroelastomer having ionized or ionizable endgroups, or it may be a perfluoroelastomer having bromine-containing groups or iodine-containing groups. The resulting perfluoroelastomer blend compositions will have bulk viscosity intermediate between that of the pure perfluoroelastomer components. The blends will have physical properties typical of the perfluoroelastomer components, but they will exhibit enhanced processability, for example extrusion behavior and mixing properties.

The carbonyl content of the perfluoroelastomers of the invention may be determined by an integrated absorbance ratio method based on Fourier transform infrared analysis. Specifically, the total content of carboxyl, carboxylate, and carboxamide groups in the polymer is determined by measuring the integrated carbonyl absorbance (i.e. the total area of all peaks in the region 1620–1840 $cm^{-1}$) of thin polymer films using a Fourier transform IR spectrometer. In order to compare the carbonyl level in different polymer samples, integrated absorbance was normalized for differences in polymer film thickness by taking the ratio of the carbonyl integrated absorbance to the thickness band integrated absorbance. Thickness band integrated absorbance was the total area of all peaks in the region 2200–2740 $cm^{-1}$. The integrated absorbance of peaks in the latter region is proportional to the thickness of the polymer film. The integrated absorbance ratio can be readily used to calculate the concentration of carbonyl groups in the polymer by comparing the integrated absorbance ratio of the polymer to that of a standard polymer of known carboxyl or carboxylate content. Such standards may be prepared from polymers of this invention which have been heated in order to completely decarboxylate them, as described in co-pending U.S. patent application Ser. No. 08/755,919 filed Nov. 25, 1996. Known amounts of a carbonyl-containing compound such as ammonium perfluorooctanoate may then be added to the substantially completely decarboxylated polymer in order to produce a calibration curve of integrated absorbance ratio versus concentration of ammonium perfluorooctanoate.

Perfluoroelastomer compositions of this invention also comprise compositions in which polymer plus curing agent is present. Generally, when used commercially, perfluoroelastomer compositions will be composed of a polymeric component, a curing agent, and optional additives. The polymeric component is a perfluoroelastomer of the types described above.

When the perfluoroelastomer has copolymerized units of a nitrile-containing cure site monomer, a cure system based on an organotin compound can be utilized. Suitable organotin compounds include allyl-, propargyl-, triphenyl- and allenyl tin curatives. Tetraalkyltin compounds or tetraaryltin compounds are the preferred curing agents for use in conjunction with nitrile-substituted cure sites. The amount of curing agent employed will necessarily depend on the degree of crosslinking desired in the final product as well as the type and concentration of reactive moieties in the perfluoroelastomer. In general, about 0.5–10 phr of curing agent can be used, and 1–4 phr is satisfactory for most purposes. It is believed that the nitrile groups trimerize to form s-triazine rings in the presence of curing agents such as organotin, thereby crosslinking the perfluoroelastomer. The crosslinks are thermally stable, even at temperatures of 275° C. and above. It has been found that the decarboxylated or partially-decarboxylated perfluoroelastomers have an unacceptably slow cure rate when compounded in accordance with conventional organotin curative recipes unless an accelerator is added. In particular, it has been found that organic or inorganic ammonium salts are unusually effective accelerators. Preferred accelerators include ammonium perfluorooctanoate, ammonium perfluoroacetate, ammonium thiocyanate, and ammonium sulfamate. Ammonium perfluorooctanoate is most preferred. These accelerators are disclosed in co-pending U.S. patent application, Ser. No. 08/756,310 filed Nov. 25, 1996, and are generally used in quantities of 0.1–2.0 parts per hundred parts perfluoroelastomer, preferably in quantities of 0.5–1.0 parts per hundred parts perfluoroelastomer. Fast-curing perfluoroelastomer compositions wherein the perfluoroelastomer component has a plurality of carbonyl-containing functional groups and the curative is an organotin curative are disclosed in co-pending U.S. patent application Ser. No. 08/755,919 filed Nov. 25, 1996.

A preferred cure system, useful for perfluoroelastomers containing nitrile-containing curesites utilizes bis(aminophenols) and bis(aminothiophenols) of the formulas

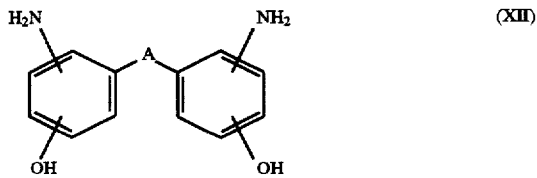

and

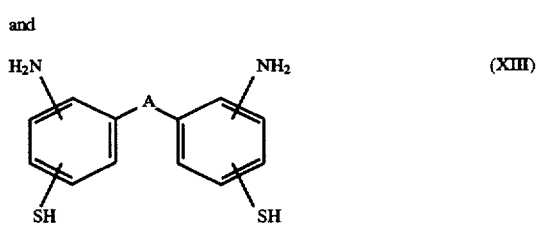

and tetraamines of the formula

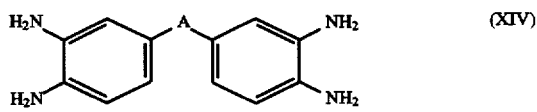

where A is $SO_2$, O, CO, alkyl of 1–6 carbon atoms, perfluoroalkyl of 1–10 carbon atoms, or a carbon-carbon bond linking the two aromatic rings. The amino and hydroxyl groups in formulas I and II above, are interchangeably in the meta and para positions with respect to the group A. Preferably, the curing agent is a compound selected from the group consisting of 4,4'-[2,2,2-trifluoro-1-(trifluoromethyl)-ethylidene]bis(2-aminophenol); 4,4'-sulfonylbis(2-aminophenol); 3,3'-diaminobenizidine; and 3,3',4,4'-tetraaminobenzophenone. The first of these is the most preferred and will be referred to as bis(aminophenol) AF. The curing agents can be prepared as disclosed in U.S. Pat. No. 3,332,907 to Angelo. Bis(aminophenol) AF can be prepared by nitration of 4,4'-[2,2,2-trifluoro-1-(trifluoromethyl)ethylidene]bisphenol (i.e. bisphenol AF), preferably with potassium nitrate and trifluoroacetic acid, followed by catalytic hydrogenation, preferably with ethanol as a solvent and a catalytic amount of palladium on carbon as catalyst. The level of curing agent should be chosen to optimize the desired properties of the vulcanizate. In general, a slight excess of curing agent over the amount required to react with all the cure sites present in the polymer is used. Typically, 0.5–5.0 parts by weight of the curative per 100 parts of polymer is required. The preferred range is 1.0–2.0 parts.

Peroxides may also be utilized as curing agents. Useful peroxides are those which generate free radicals at curing temperatures. A dialkyl peroxide or a bis(dialkyl peroxide) which decomposes at a temperature above 50° C. is especially preferred. In many cases it is preferred to use a ditertiarybutyl peroxide having a tertiary carbon atom attached to peroxy oxygen. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides can be selected from such compounds as dicumyl peroxide, dibenzoyl peroxide, tertiarybutyl perbenzoate, and di[1,3- dimethyl-3-(t-butylperoxy)-butyl]carbonate. Generally, about 1–3 parts of peroxide per 100 parts of perfluoroelastomer is used. Another material which is usually blended with the composition as a part of the peroxide curative system is a coagent composed of a polyunsaturated compound which is capable of cooperating with the peroxide to provide a useful cure. These coagents can be added in an amount equal to 0.1 and 10 parts per hundred parts perfluoroelastomer, preferably between 2–5 parts per hundred parts perfluoroelastomer. The coagent may be one or more of the following compounds: triallyl cyanurate; triallyl isocyanurate; tri(methylallyl) isocyanurate; tris(diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; and tri(5-norbornene-2-methylene)cyanurate. Particularly useful is triallyl isocyanurate.

Depending on the cure site monomers present, it is also possible to use a dual cure system. For example, perfluoroelastomers having copolymerized units of nitrile-containing cure site monomers can be cured using a curative comprising a mixture of a peroxide in combination with an organotin curative and a coagent. Generally, 0.3–5 parts of peroxide, 0.3–5 parts of coagent, and 0.1–10 parts of organotin curative are utilized.

Additives, such as carbon black, stabilizers, plasticizers, lubricants, fillers, and processing aids typically utilized in perfluoroelastomer compounding can be incorporated into the compositions of the present invention, provided they have adequate stability for the intended service conditions. In particular, low temperature performance can be enhanced by incorporation of perfluoropolyethers.

Carbon black fillers are used in elastomers as a means to balance modulus, tensile strength, elongation, hardness, abrasion resistance, conductivity, and processability of the compositions. In perfluoroelastomer compositions, small particle size, high surface area carbon blacks have been the fillers of choice. A grade commonly chosen is SAF carbon black, a highly reinforcing black with typical average particle size of about 14 nm and designated N 110 in Group No. 1, according to ASTM D-1765. The particular carbon blacks useful in the compositions of the present invention are those described in WO 95/22575. These particular carbon blacks have average particle sizes of at least about 100 nm to about 500 nm as determined by ASTM D-3849. Examples include MT blacks (medium thermal black) designated N-991, N-990, N-908, and N-907, and large particle size furnace blacks. MT blacks are preferred. When used, 1–70 phr of large size particle black is generally sufficient, and this amount does not retard cure time.

In addition, fluoropolymer fillers may also be present in the composition. Generally from 1 to 50 parts per hundred perfluoroelastomer of a fluoropolymer filler is used, and preferably at least about 5 parts per hundred parts perfluoroelastomer is present. The fluoropolymer filler can be any finely divided, easily dispersed plastic fluoropolymer that is solid at the highest temperature utilized in fabrication and curing of the perfluoroelastomer composition. By solid, it is meant that the fluoroplastic, if partially crystalline, will have a crystalline melting temperature above the processing temperature(s) of the perfluoroelastomer(s). Such finely divided, easily dispersed fluoroplastics are commonly called micropowders or fluoroadditives. Micropowders are ordinarily partially crystalline polymers.

Micropowders that can be used in the composition of the invention include, but are not limited to, those based on the group of polymers known as tetrafluoroethylene (TFE) polymers. This group includes homopolymers of TFE (PTFE) and copolymers of TFE with such small concentrations of at least one copolymerizable modifying monomer that the resins remain non-melt-fabricable (modified PTFE). The modifying monomer can be, for example, hexafluoropropylene (HFP), perfluoro(propyl vinyl) ether (PPVE), perfluorobutyl ethylene, chlorotrifluoroethylene, or another monomer that introduces side groups into the polymer molecule. The concentration of such copolymerized modifiers in the polymer is usually less than 1 mole percent. The PTFE and modified PTFE resins that can be used in this invention include both those derived from suspension polymerization and from emulsion polymerization.

High molecular weight PTFE used in production of micropowder is usually subjected to ionizing radiation to reduce molecular weight. This facilitates grinding and enhances friability if the PTFE is produced by the suspension polymerization process, or suppresses fibrillation and enhances deagglomeration if the PTFE is produced by the emulsion polymerization process. It is also possible to polymerize TFE directly to PTFE micropowder by appropriate control of molecular weight in the emulsion polymerization process, such as disclosed by Kuhls et al. in U.S. Pat. No. 3,956,000. Morgan, in U.S. Pat. No. 4,879,362, discloses a non-melt-fabricable, non-fibrillating modified PTFE produced by the emulsion (dispersion) polymerization process. This polymer forms platelets on shear blending into elastomeric compositions, instead of fibrillating.

TFE polymers also include melt-fabricable copolymers of TFE having sufficient concentrations of copolymerized units of one or more monomers to reduce the melting point significantly below that of PTFE. Such copolymers generally have melt viscosity in the range of $0.5-60\times10^3$ Pa.s, but viscosities outside this range are known. Perfluoroolefins and perfluoro(alkyl vinyl) ethers are preferred comonomers. Hexafluoropropylene and perfluoro(propyl vinyl) ether are most preferred. Melt fabricable TFE copolymers such as FEP (TFE/hexafluoropropylene copolymer) and PFA [TFE/perfluoro(propyl vinyl)ether copolymer] can be used, provided they satisfy constraints on melting temperature with respect to perfluoroelastomer processing temperature. These copolymers can be utilized in powder form as isolated from the polymerization medium, if particle size is acceptable, or they can be ground to suitable particle size starting with stock of larger dimensions.

The curable compositions of the present invention are useful in production of gaskets, tubing, and seals. Such articles are produced by molding a compounded formulation of the curable composition with various additives under pressure, curing the part, and then subjecting it to a post cure cycle. The cured compositions have excellent thermal stability and chemical resistance. They are particularly useful in applications such as seals and gaskets for manufacturing semiconductor devices, and in seals for high temperature automotive uses.

The invention is now illustrated by certain embodiments wherein all parts are by weight unless otherwise specified.

EXAMPLES

TEST METHODS

Cure Characteristics

Cure characteristics were measured using a Monsanto oscillating disk rheometer (ODR), under conditions corresponding to ASTM D 2084. The following cure parameters were recorded:

$M_{max}$: maximum torque level, in units of N·m
$M_{min}$: minimum torque level, in units of N·m
$M_{max}$- $M_{min}$ difference between maximum and minimum torque, in units of N·m
$t_s2$: minutes to 2.26 N·m rise above $M_{min}$
$t_c90$: minutes to 90% of maximum torque
Stress/strain properties were measured according to ASTM D 412. The following parameters were recorded:
  $M_{100}$ modulus at 100% elongation in units of MPa
  $T_B$ tensile strength at break in units of MPa.
  $E_B$ elongation at break in units of %
Compression set of O-ring samples was determined in accordance with ASTM D 395.

Example 1

A perfluoroelastomer terpolymer having copolymerized units of approximately 54.8 wt. % tetrafluoroethylene (TFE), 43 wt. % perfluoro(methyl vinyl) ether (PMVE) and 2.2 wt. % perfluoro(8-cyano-5-methyl-3,6-dioxa-1-octene) (8-CNVE), having an inherent viscosity of 0.53 (as measured by dissolving 0.2 g of polymer in 100 ml of a mixed solvent of 60 wt. % FC-437, 40 wt. % FC-75, 3 wt. % diglyme at 30° C.), and an integrated absorbance ratio of 0.46 was used in this Example.

The perfluoroelastomer terpolymer was prepared by aqueous emulsion polymerization, at 85° C. and approximately 600 psi (4.1 MPa) in a continuous reactor with agitation. The surfactant for the polymerization was ammonium perfluorooctanoate and the sole initiator was ammonium persulfate. TFE and PMVE monomers were fed from compressors and liquid cure site monomer, 8-CNVE, was fed neat from a high pressure metering pump. A buffering salt, disodium hydrogen phosphate, was present to control the pH in the range 4.5–6.5 to counteract acidity generated by persulfate decomposition. Upon exiting the reactor, the polymer emulsion was coagulated with an aqueous solution of magnesium sulfate. The coagulated polymer was then washed with deionized water and dried in a circulating air oven at 80° C. for 48 hours to form a polymer crumb, hereinafter referred to as "Polymer Crumb A". Polymer Crumb A had Mooney Viscosity (ML-10 @ 121° C.) of 116.

Polymer Crumb A was heat treated in a circulating air oven at 300° C. for 60 minutes in order to produce a substantially decarboxylated polymer of this invention. This polymer had Mooney Viscosity (ML-10 @ 121° C.) of 69, which represents a substantial decrease compared to the Mooney viscosity of Polymer Crumb A. As a result of its lower viscosity, the heat treated polymer of this invention is easier to process than the non-heat treated Polymer Crumb A.

The heat treated polymer was then compounded with 30 phr medium thermal carbon black (MT black) and 1.0 phr 2,2-bis(3-amino-4-hydroxyphenyl)hexafluoropropane [bis (aminophenol) AF] curative on a rubber mill to produce a curable composition of this invention. Cure response was determined by ODR, according to ASTM D 2084. Results are shown in Table I. Stress/strain properties were measured on one set of test specimens which had been died out of polymer sheet press-cured at 210° C. for 20 minutes and on a second set which had been press-cured, then post-cured at 300° C. for 18 hours in an air oven. Values of compression set for O-ring samples press-cured at 275° C. for 20 minutes and for O-rings press-cured, then post-cured for 18 hours at 300° C. in an air oven also are shown in Table I.

Comparative Example A

A sample of Polymer Crumb A which had not been subjected to heat treatment was compounded with carbon black and curative as described in Example 1. Cure response was determined by ODR according to ASTM D 2084. Results are shown in Table I.

It can be seen from the data shown in Table I that the curable composition of heat treated substantially decarboxylated polymer of Example 1 exhibited a faster cure response, a higher cure state, and a lower minimum viscosity than the non-heat treated comparative sample, as indicated by the lower tc90, higher $M_{max}$- $M_{min}$, and a lower $M_{min}$ of the Example 1 composition.

TABLE I

|  | Example 1 | Comparative Ex. 1 |
|---|---|---|
| Physical Properties |  |  |
| ODR |  |  |
| $M_{max}$ (N · m) | 4.3 | 4.1 |
| $M_{min}$ (N · m) | 0.3 | 0.7 |
| $M_{max}$ - $M_{min}$ (N · m) | 4.0 | 3.4 |
| $t_s2$ (minutes) | 4.2 | 4.5 |
| $t_c90$ (minutes) | 7.8 | 12.0 |
| Stress/Strain Properties |  |  |
| Press-cured |  |  |
| $M_{100}$ (MPa) | 12.7 | — |
| $T_B$ (MPa) | 15.9 | — |
| $E_B$ (%) | 187 | — |
| Post-cured |  |  |
| $M_{100}$ (MPa) | 14.8 | — |
| $T_B$ (MPa) | 23.2 | — |
| $E_B$ (%) | 173 | — |
| Compression Set |  |  |
| Press-cured (%) | 37 | — |
| Post-cured (%) | 20 | — |

Example 2

Polymer Crumb B was prepared in substantially the same manner as described for preparation of Polymer Crumb A in Example 1 except a slightly higher $R_i/R_p$ was used. Polymer Crumb B had Mooney Viscosity (ML-10 @ 121° C.) of 85, an inherent viscosity of 0.48, and an absorbance ratio of 0.430. The Polymer Crumb B was formed into a void-free 4 mm thick sheet by pressing at 150° C. for 3 minutes. The sheet was then heat-treated under various conditions in a circulating air oven in order to partially decarboxylate the polymer. Heat treatment of this polymer at 300° C. for one hour resulted in reduction of Mooney viscosity, ML-10 @ 121° C., to 58.

Fourier Transform infrared spectra were run on thin films pressed at 150° C. for 2 minutes to measure the carbonyl-containing endgroup concentration as a function of the heating time and temperature. The data in Table II show the effect of various heat treatments on the integrated Absorbance Ratio. Absorbance Ratio is also expressed as the fraction of remaining carbonyl-containing endgroups by dividing the Absorbance Ratio of the indicated sample by that of Polymer Crumb B.

TABLE II

| Time/Temperature in Air Oven (4 mm Thick Polymer Sheet) | Absorbance Ratio | Fraction Carboxyl or Carboxylate Endgroups Remaining |
|---|---|---|
| 15 minutes/255° C. | 0.430 | 1.00 |
| 30 minutes/255° C. | 0.371 | 0.863 |
| 60 minutes/255° C. | 0.255 | 0.592 |
| 15 minutes/270° C. | 0.368 | 0.851 |
| 30 minutes/270° C. | 0.197 | 0.459 |
| 60 minutes/270° C. | 0.135 | 0.314 |
| 15 hours/270° C. | 0.0322 | 0.0750 |
| 15 minutes/280° C. | 0.250 | 0.582 |
| 30 minutes/280° C. | 0.186 | 0.433 |
| 60 minutes/280° C. | 0.0695 | 0.162 |
| 5 minutes/300° C. | 0.427 | 0.994 |
| 10 minutes/300° C. | 0.338 | 0.786 |
| 5 minutes/300° C. | 0.211 | 0.491 |
| 30 minutes/300° C. | 0.147 | 0.341 |
| 60 minutes/300° C. | 0.0805 | 0.187 |

The rheological properties of several samples that were heat-treated at 300° C. (Table II) were evaluated using a Rosand Capillary Rheometer at a shear rate of 1500/sec. at 90° C. Samples were cut from the 4 mm thick, void-free sheets described above. The results of that evaluation, as shown in Table III, indicate that both the shear stress and the shear viscosity are sharply reduced by heat treating the polymer. The data further indicate that this effect is dependent on heating time (Table III). dependent on heating time (Table III).

TABLE III

| Time in 300° C. Air Oven (Minutes) | Shear Stress (kPa) | Shear Viscosity (Pa · s) |
|---|---|---|
| 0 | 2151 | 1434 |
| 5 | 1200 | 800 |
| 10 | 705 | 470 |
| 15 | 606 | 404 |

Example 3

A perfluoroelastomer was prepared in substantially the same manner as the perfluoroelastomer of Example 1, except that a lower $R_i/R_p$) was used. After isolation, the polymer crumb was heat treated in a circulating air oven at 300° C. for 60 minutes in order to produce a substantially decarboxylated polymer of this invention. Mooney Viscosity (ML-10 @ 121° C.) of 106, and an integrated absorbance ratio of 0.32. This substantially decarboxylated polymer is designated Polymer 1 in Table IV. Polymer 1 and non-heated perfluoroelastomer (designated Polymer 2) were compounded with the additives shown in Table IV. ODR test specimens were prepared from the compounded samples. As indicated by the 200° C. ODR data shown in Table IV, curable compositions of Polymer 1 cured very slowly with tetraphenyltin curative. Samples of non-heat treated Polymer 2 cured well with tetraphenyltin. When ammonium perfluorooctanoate, which is a source of ammonium carboxylate salt, was added to Polymer 1, cure was satisfactory, i.e. there was a surprisingly sharp increase in cure rate. In addition, the sample exhibited an increased cure state.

TABLE IV

| Component | Example 3A | Example 3B | Example 3C (Comparative) |
|---|---|---|---|
| Polymer 1 | 100 | 100 | — |
| Polymer 2 | — | — | 100 |
| SRF Carbon Black | 10 | 10 | 10 |
| Tetraphenyltin | 2 | 2 | 2 |
| Ammonium Perfluorooctanoate | — | 1 | — |
| ODR Cure Response (200°/24 minutes) | | | |
| $M_{max}$ (N · m) | 1.0 | 3.1 | 3.5 |
| $M_{min}$ (N · m) | 0.48 | 0.70 | 1.0 |
| $M_{max} - M_{min}$ (N · m) | 0.52 | 2.4 | 2.5 |
| ts2 (minutes) | 17.0 | 1.9 | 3.8 |
| tc50 (minutes) | 18.0 | 3.1 | 8.1 |
| tc90 (minutes) | 23.0 | 11.6 | 18.4 |

Example 4

A perfluoroelastomer containing copolymerized units of tetrafluoroethylene, perfluoro(methyl vinyl) Ether, and perfluoro-8(cyano-5-methyl-3,6-dioxa-1-octene) in a molar ratio of approximately 67.2/32.1/0.7 was prepared as follows: an aqueous solution consisting of 20 liters of deionized water, 93 g of ammonium persulfate, 810 g of disodium hydrogen phosphate heptahydrate and 182 g of ammonium perfluorooctanoate (Fluorad® FC-143 fluorinated surfactant) was pumped into a 5 liter mechanically stirred, water-jacketed stainless steel autoclave at a rate of 688 ml/hour. A third stream consisting of 22.3 g/hour of perfluoro-(8-cyano-5-methyl-3,6-dioxa-1-octene) was metered in simultaneously. By means of a diaphragm compressor a gaseous mixture of tetrafluoroethylene (363 g/hour) and perfluoro(methyl vinyl)ether (412 g/hour) monomer was fed in at a constant rate. The temperature of the reactor was maintained at 85° C. and 6.2 MPa (900 psi) pressure throughout the reaction and the pH was controlled at 6.6. The polymer latex was removed continuously by means of a let down valve and unreacted monomers were vented. The latex from 16 hours of operation was collected and the polymer was isolated as follows: 5 liters of the above latex was added with stirring to a preheated (90°–95° C.) solution consisting of 225 g of magnesium sulfate heptahydrate and 40 liters of deionized water. The coagulated crumb polymer which resulted was filtered, washed repeatedly with water, and dried in an air oven at 70° C. for 48 hours. The dried polymer weighed 9489 g and had the following composition, 42.9 w.t % perfluoro(methyl vinyl) ether, 2.2 wt. % perfluoro(8-cyano-5-methyl-3,6-dioxa-1-octene), the remainder being tetrafluoroethylene. The polymer had inherent viscosity of 0.74 dl/g measured in a solution containing 0.1 g of polymer per 100 g of solvent consisting of 60/40/3 volume ratio of heptafluoro-2,2,3-trichlorobutane, perfluoro (α-butyltetrahydrofuran) and ethylene glycol dimethyl ether.

The polymer was extruded in a 30 mm twin screw extruder equipped with a vacuum port, operating at approximately 30 in Hg vacuum (760 mm Hg), and a single hold die, approximately 0.188 in. in diameter. The temperature profile was as shown in Table V.

TABLE V

| Extruder Zone | Temperature |
|---|---|
| Feed Zone | 150 |
| 1 | 315 |
| 2 | 315 |
| 3 | 315 |
| 4 | 315 |
| Die | Unheated |

The polymer melt temperature, as measured with a hand-held pyrometer was 320° C. The polymer was fed to the extruder at the rate of 4.54 kg/hour using a weigh feeder. The screw speed was 100 rpm. The Integrated Absorbance Ratio, Mooney viscosity, and melt rheology were measured. Results are shown in Table VI.

TABLE VI

| Properties | Before Extrusion | After Extrusion |
|---|---|---|
| Absorbance Ratio | 0.39 | 0.21 |
| Mooney Viscosity | 18 | 17 |
| Melt Rheology, Rosand Capillary @ 90° C. | | |
| Shear Viscosity (Pa · s) | | |
| Shear Rate 600/s | 1014 | 779 |
| Shear Rate 1500/s | 697 | 322 |

I claim:

1. A process for preparation of an uncured perfluoroelastomer composition comprising the steps of
    A) preparing a perfluoroelastomer having a plurality of carbonyl-containing functional groups selected from the group consisting of carboxyl endgroups, carboxylate endgroups, carboxamide endgroups, and mixtures thereof by copolymerizing a monomer mixture comprising a) a perfluoroolefin monomer and b) a perfluorovinyl ether monomer selected from the group consisting of perfluoro(alkyl vinyl) ethers, perfluoro(alkoxy vinyl) ethers, and mixtures thereof at a pressure of from 4–10 MPa, in the presence of a persulfate free radical initiator, in a polymerization mixture, wherein i) the feed ratio of monomer to initiator is controlled so that the ratio of the radical flux to the polymerization rate, $R_f/R_p$, is from about 10 to 50 millimoles per kilogram, and ii) less than 5 mole percent of a sulfite or bisulfite reducing agent, based on the millimoles of persulfate initiator, is present in the polymerization mixture;
    B) isolating said perfluoroelastomer having a plurality of carbonyl-containing functional groups; and
    C) heating said isolated perfluoroelastomer having a plurality of carbonyl-containing functional groups at a temperature of at least 250° C. for a time sufficient to at least partially decarboxylate the perfluoroelastomer.

2. A process of claim 1 wherein the heating in step C) takes place at a temperature within the range of 280° C.–320° C.

3. A process of claim 1 wherein step C) is accomplished by heating in an oven.

4. A process of claim 1 wherein step C) is accomplished by heating in an extruder.

5. A process of claim 1 wherein step C) is accomplished by heating in a compression mold.

6. A process of claim 1 wherein step C) is accomplished by heating using microwave radiation.

* * * * *